United States Patent [19]

Sarro et al.

[11] Patent Number: 4,733,618
[45] Date of Patent: Mar. 29, 1988

[54] APPARATUS FOR SUPPORTING EQUIPMENT ON AN ELEVATED SURFACE

[75] Inventors: Joseph F. Sarro, San Anselmo; Gene Tepper, Sausalito; Theodore L. Renteria, San Jose, all of Calif.

[73] Assignee: The Sarro Company, San Francisco, Calif.

[21] Appl. No.: 849,158

[22] Filed: Apr. 7, 1986

[51] Int. Cl.⁴ .................................. A47B 11/00
[52] U.S. Cl. ............................ 108/140; 108/102; 248/282; 248/285; 248/289.1
[58] Field of Search ............ 248/282, 283, 285, 289.1, 248/296, 295.1, 130, 418; 108/140, 139, 142, 94, 102

[56] References Cited

U.S. PATENT DOCUMENTS

| | | | |
|---|---|---|---|
| 3,319,914 | 5/1967 | Chiappetta | 108/140 X |
| 4,071,174 | 1/1978 | Weiner | 248/285 X |
| 4,270,721 | 6/1981 | Mainor | 248/285 |
| 4,546,708 | 10/1985 | Wilburth | 248/282 X |
| 4,561,619 | 12/1985 | Robillard et al. | 248/285 |
| 4,562,987 | 1/1986 | Leeds et al. | 248/278 |
| 4,648,574 | 3/1987 | Granlund | 248/285 X |
| 4,659,048 | 4/1987 | Fahrion | 248/287 |

FOREIGN PATENT DOCUMENTS

| | | |
|---|---|---|
| 3003017 | 7/1981 | Fed. Rep. of Germany ... 248/1 E X |
| 3132015 | 8/1981 | Fed. Rep. of Germany . |
| 3406581 | 2/1984 | Fed. Rep. of Germany . |
| 8403573 | 9/1984 | PCT Int'l Appl . |

OTHER PUBLICATIONS

CRT Float, *Global Computer Supplies*, 1986, p. 3.
CRT Shuttle, *Global Computer Supplies*, 1986, p. 61.
CRT Turntable, *Global Computer Supplies*, 1986, p. 64.

Primary Examiner—Ramon O. Ramirez
Attorney, Agent, or Firm—Majestic, Gallagher, Parsons & Siebert

[57] ABSTRACT

An apparatus for movably supporting equipment on a surface which is elevated from the ground level. The apparatus includes a support member adapted for supporting equipment. The support member is movably supported by the surface so that equipment supported by the support member is movable to desired locations on the surface. The apparatus further includes a restraining member for restraining the movement of the support member on the surface to prevent the support member and the equipment thereon from falling off the surface.

16 Claims, 5 Drawing Figures

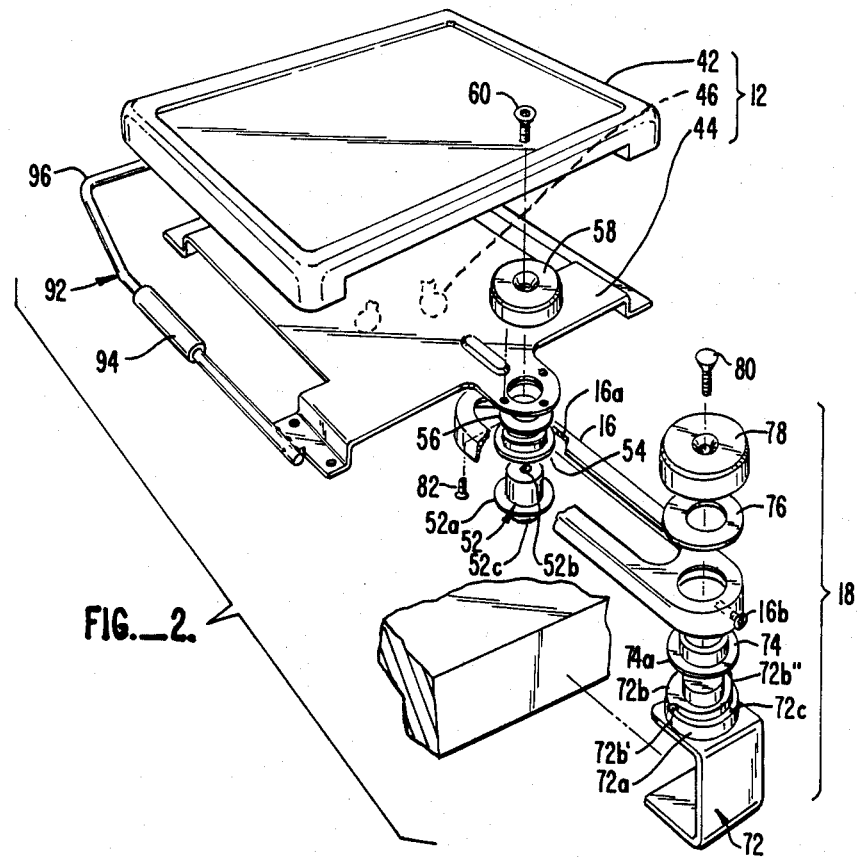
FIG._2.
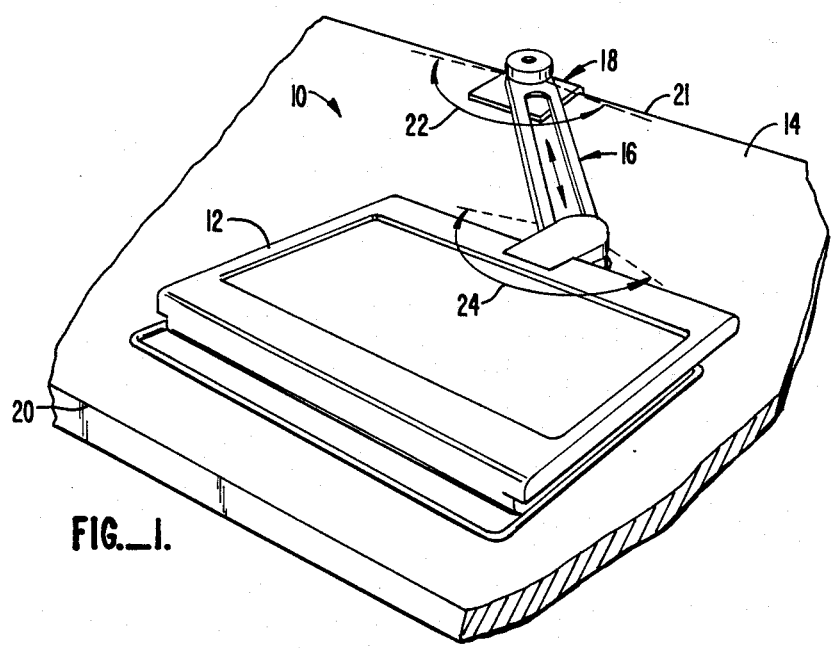
FIG._1.

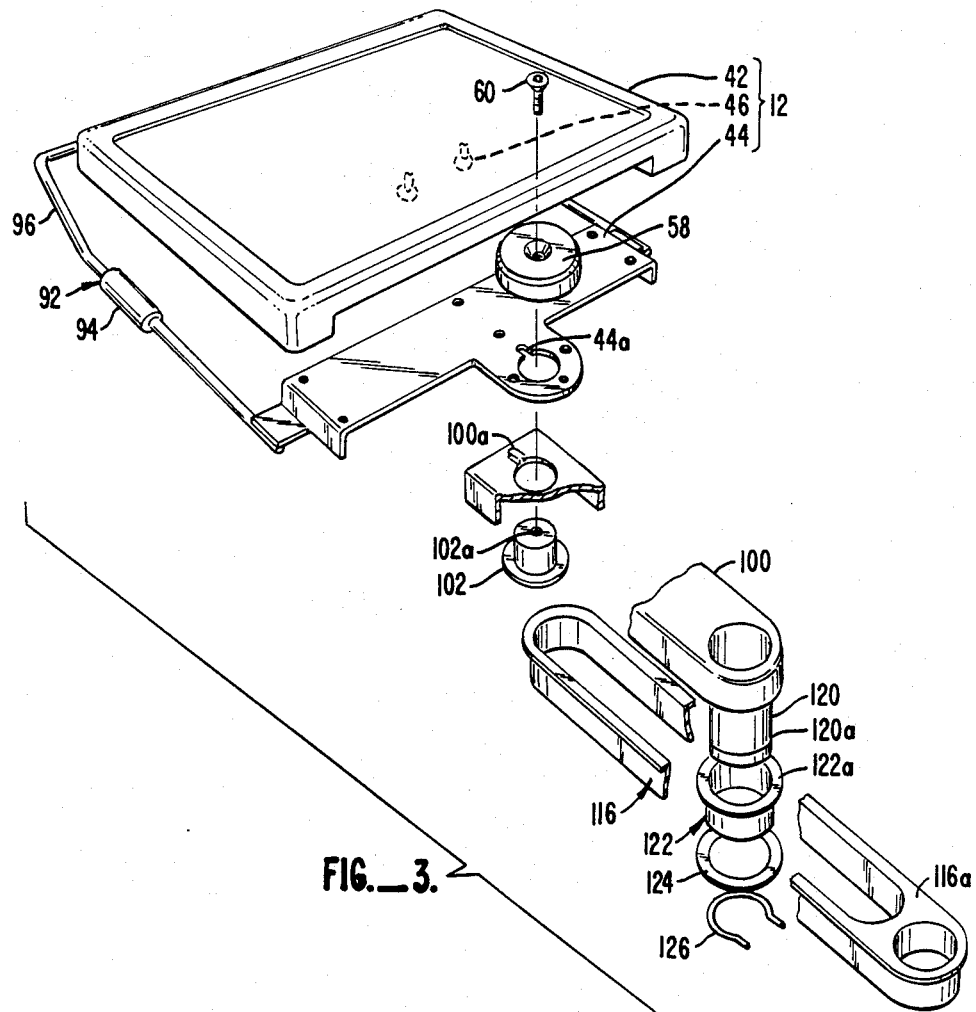
FIG._3.

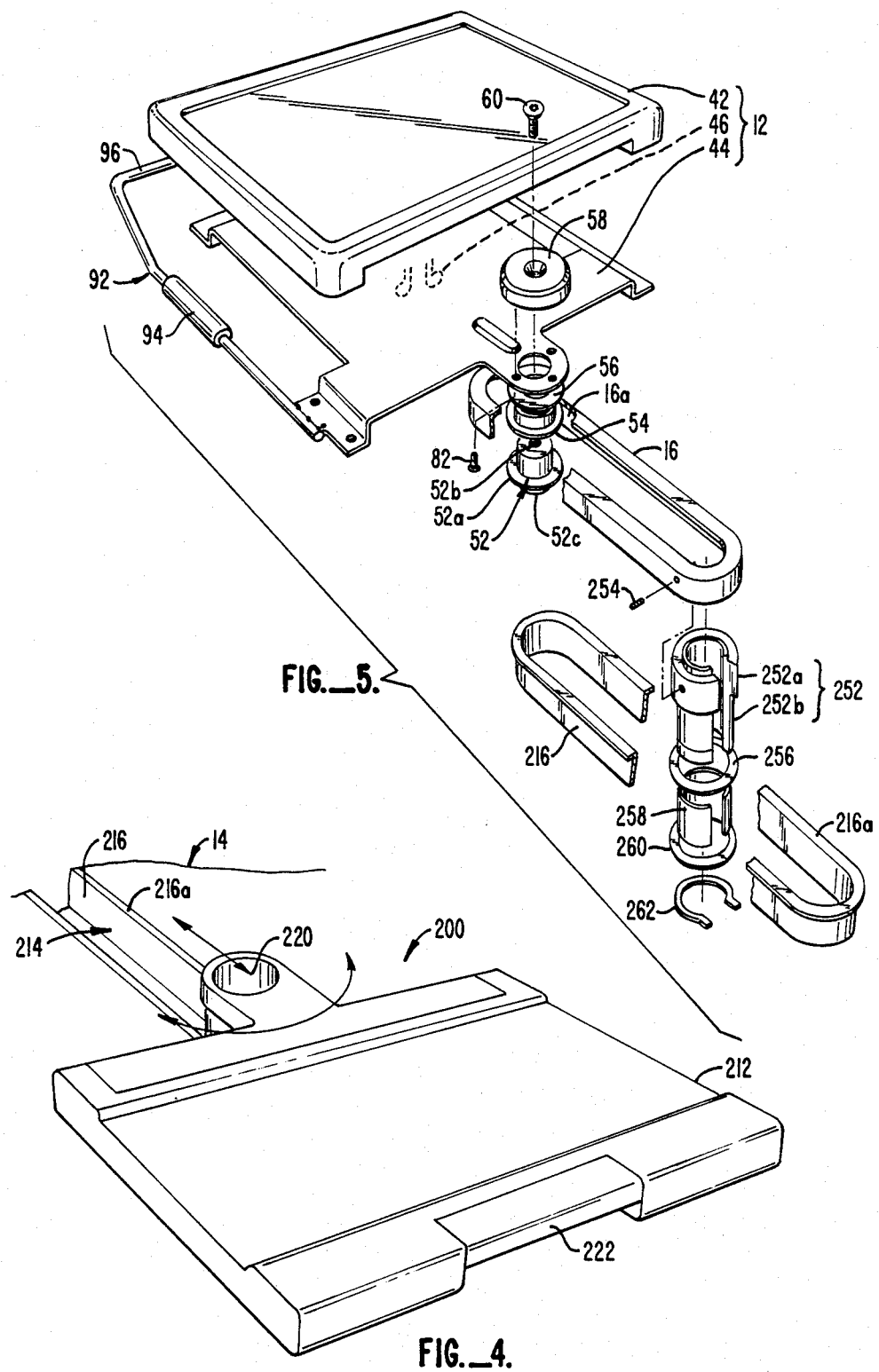

APPARATUS FOR SUPPORTING EQUIPMENT ON AN ELEVATED SURFACE

BACKGROUND OF THE INVENTION

This invention relates to devices for supporting equipment on elevated surfaces so that the equipment is movable to desired locations on the surfaces.

Computers have been increasingly used in businesses and homes. Ordinarily, a computer monitor such as a cathode ray tube (CRT) is placed on a desk so that a viewer can comfortably view the screen. Computer monitors, however, take up considerable space on the desk top, particularly space close to the user. Thus, the monitor may block the user not only from using the space immediately in front of the user but also access to desk top space behind and surrounding the monitor. In order to free the desk top space otherwise blocked by the monitor, a user must manually move the monitor to a different location when the monitor is not in use. This is inconvenient and frequent relocation of the computer monitor increases the likelihood of accidental damage. It is therefore desirable to provide a device for conveniently and safely removing the computer monitor from the desk top location immediately adjacent to the user.

Different types of devices for supporting and removing computer monitors have been proposed. In one type manufactured by Global Computer Supplies of Compton, Calif. known as the CRT Float, the device comprises a platform for supporting the CRT where the platform can be floated up and down at different levels above the desktop. The platform and a computer monitor thereon are supported by arms anchored to the desk. In the CRT Float, the weight of the computer monitor is entirely supported by a tilted arm. Thus, if the tilted arm is slightly off the desired position, the platform may be caused to tilt. This may increase the chances for the monitor to fall off the platform, causing injury to the user and damage to the monitor.

Another type of device also manufactured by Global Computer Supplies is known as the CRT turntables. These devices would allow the CRT to be rotated or tilted but not moved from a location immediately adjacent to the user. None of the above-described devices are completely satisfactory. It is therefore desirable to provide an improved system for supporting equipment such as computer monitors on elevated surfaces so that equipment can be safely and conveniently removed.

SUMMARY OF THE INVENTION

An apparatus is provided for movably supporting equipment on a surface, said surface being elevated from the ground level. The apparatus comprises a support member adapted for supporting equipment, said member being movably supported by said surface so that equipment supported by the support member is movable to desired locations on the surface where the equipment is supported by the surface through the support member. The apparatus further comprises a restraining member for restraining the movement of said support member on the surface to prevent the equipment supported on the support member from falling off the surface.

BRIEF DESCRIPTION OF THE DRAWINGS

FIG. 1 is a perspective view of an apparatus for movably supporting equipment on a surface such as a table top to illustrate the invention.

FIG. 2 is an exploded perspective view of the apparatus of FIG. 1 to illustrate the preferred embodiment of the invention.

FIG. 3 is an exploded perspective view of an apparatus for movably supporting equipment on a surface such as a table top to illustrate an alternative embodiment of the invention.

FIG. 4 is a perspective view of an apparatus for movably supporting equipment on an elevated surface to illustrate a second alternative embodiment of the invention.

FIG. 5 is a perspective view of an apparatus for moving supporting equipment on an elevated surface to illustrate a third alternative embodiment of the invention.

DETAILED DESCRIPTION OF THE INVENTION

FIG. 1 is a perspective view of an apparatus for movably supporting equipment on an elevated surface to illustrate the invention. As shown in FIG. 1, the apparatus 10 of this invention comprises a platform 12 which is supported by an elevated surface 14. Platform 12 is also pivotally connected to surface 14 so that equipment supported on platform 12 is movable to desired locations on surface 14 safely and conveniently. Platform 12 is adapted for supporting equipment, such as a computer monitor. Obviously, platform 12 may be designed to be adapted for supporting other equipment as well and such uses of the apparatus 10 are within the scope of the invention.

Platform 12 is supported by surface 14 through rollers (not shown in FIG. 1) so that platform 12 may be easily moved to a desired location on the surface. However, to prevent platform 12 and the equipment supported thereon from falling off surface 14, the movement of platform 12 on surface 14 is restrained by a restraining member 16. The restraining member 16 is connected to surface 14 so as to prevent the equipment from falling off surface 14. In the preferred embodiment, the apparatus further includes a connecting member 18 for connecting the restraining member to surface 14.

In the preferred embodiment, the connection between restraining member 16 and connecting member 18 is such that the restraining member 16 is rotatable about a location on surface 14, which may be the location of member 18 as shown in FIG. 1. Restraining member 16 is preferably elongated so that the movement of platform 12 is restricted to within a radius equal to the length of restraining member 16. This prevents platform 12 and the equipment thereon to be moved to a location where the platform protrudes beyond an edge of surface 14, such as edge 20, causing the equipment supported on platform 12 to fall off surface 14.

Where connecting member 18 is in the form of a clamping member which clamps onto an edge 21 of surface 14, it is preferable for restraining member 16 to be rotatable about connecting member 18 only within a preset angle, such as angle 22 in FIG. 1. Since the connecting member 18 connects the restraining member to edge 21 of surface 14, unrestricted rotations of the restraining member will cause platform 12 to be moved to a location not supported or not entirely supported by surface 14, thereby causing the equipment supporting thereon to fall off the surface. Therefore, by restricting the angle of rotation of restraining member 16 about the location of member 18, the above described scenario is prevented from happening.

In the preferred embodiment, platform 12 is connected to restraining member 16 in such manner that the connection therebetween is not fixed but is slidable along the length of member 16 to vary the distance between platform 12 and connecting member 18. This increases the flexibility of device 10. To further increase the flexibility of the device, platform 12 may be pivotally connected to restraining member 16 so that platform 12 may be rotated within a preset angle 24 relative to member 16 in FIG. 1.

FIG. 2 is an exploded view of apparatus 10 of FIG. 1 to illustrate the preferred embodiment of the invention. As shown in FIG. 2, platform 12 comprises a tray 42, mounting plate 44 and rollers 46 (shown in phantom in FIG. 2). Tray 42 is attached to mounting plate 44 by a conventional means such as screws (not shown) and the mounting plate is in turn attached to rollers 46. In this manner the equipment placed on top of tray 42 is supported by rollers 46 movably on surface 14 of FIG. 1.

Mounting plate 44 of platform 12 is connected to the restraining member 16 as follows. This inside surface 16a of member 16 defines a groove thereon in which the flange 52a of a ball transfer and housing assembly 52 fits slidably. Assembly 52 is connected to the mounting plate 44 through a bearing sleeve 54, washer 56, cap 58 and screw 60 shown in FIG. 2 as a vertical column. Thus, when the vertical column is assembled together and screw 60 is screwed downwards into the complimentary threaded hole 52b, assembly 52 is securely but rotatably attached to mounting plate 44. Therefore, when flange 52a of assembly 52 slides along the groove on the inside surface 16a of the restraining member, tray 42 and equipment supported thereon may be moved towards or away from connecting member 18. Assembly 52 further includes a ball 52c at the bottom; ball 52c is adapted to contact surface 14. In such manner the different parts for connecting the ball assembly 52 to mounting plate 44 are supported by surface 14. Mounting plate 44 may be attached to cap 58 by screws 82.

Connecting member 18 includes a clamp 72, bearing sleeve 74, washer 76, cap 78 and screw 80. A conventional screw assembly for tightening the clamp 72 may be used but is not shown in FIG. 2 to simplify the drawing. When the column is assembled and screw 80 screwed into a complimentary hole at the top of clamp 72, restraining member 16 is pivotally and securely connected to the connecting member 18. Member 16 is provided with a portion 16b which may simply be a screw screwed into a hole in the member as shown in FIG. 2. The clamp 72 has on top a raised portion 72a and on top on portion 72a a raised curved curb 72b with ends 72b', 72b''. Between ends 72b', 72b'' is a curved recess 72c. Curb 72b and recess 72c together surround the pivot of connecting member 18, the pivot in this case being screw 80. When the column is assembled, portion 16a protrudes into recess 72c. When member 16 is rotated relative to member 18 about pivot screw 80, portion 16b moves in the recess 72c and is stopped only by ends 72b', 72b'' of the curb. When portion 16b contacts either of the ends of the curb, member 16 cannot be rotated further. Hence, the angular separation between ends 72b', 72b'' at the pivot defines the angle through which member 16 may be rotated relative to member 18. Clamp 72 allows connecting member to be attached to surface 14.

If surface 14 is not level or if tray 42 is accidentally pushed, tray 42 may be caused to roll across the surface, which may cause the equipment thereon to fall off surface 14. To prevent this from happening, a braking mechanism is provided. As shown in FIG. 2, a braking member 92 is connected to mounting plate 44 to prevent unintended movement of the platform and equipment. Member 92 comprises a friction element 94 attached to handle 96. Unless handle 96 is raised, element 94 is in contact with surface 14, thereby preventing the platform 12 and the equipment thereon from moving. When the equipment is not in use, the handle may be lifted, causing the element 94 to be lifted from surface 14, so that the equipment may be moved in a desired manner.

FIG. 3 is an exploded perspective view of an apparatus for movably supporting equipment on a surface such as a table top to illustrate an alternative embodiment of the invention. The components identical in FIGS. 2 and 3 are labeled by the same numerals. As shown in FIG. 3, platform 12 is essentially the same as that of FIG. 2, including braking mechanism 92. In the alternative embodiment, a different restraining member 116 is used. For this reason, a tray/slide connector 100 is employed to connect mounting plate 44 to member 116. Connector 100 is attached to plate 44 by retainer 102, cap 58 and screw 60 which fits into a complementary threaded hole 102a in retainer 102. Protruding portion 100a fits into notch 44a so that plate 44 is not rotatable relative to connector 100. Connector 100 is integral at the other end with a post 120.

Post 120 is connected slidably to member 116 so that the distance between platform 12 and the connecting member (not shown) may be changed as desired. The connection is accomplished as follows. Member 116 has a flange 116a. Post 120 passes through bearing sleeve 122 which has a flange 122a. Sleeve 122 and flange 122a are of such sizes and shapes that the sleeve fits slidably into member 116 with flange 122a in contact with the top surface of flange 116a. Post 120 further passes through retainer 124 and a snap ring 126 fits snugly into groove 120a of post 120, so that when the vertical column of parts 120, 122, 124, 126 are assembled by telescoping, the snap ring fitting into groove 120a holds the assembly together.

The vertical column of parts 120-126 is assembled as follows. Post 120 is inserted into sleeve 122 and sleeve 122 is in turn inserted into the elongated hole in member 116 until flange 122a is sitting on top of flange 116a. Then retainer 124 is mounted on to post 120 from below. Snap ring 126 is then snapped into groove 120a to hold the assembly together. In this manner the vertical column has been assembled in such manner that it is slidably and securely connected to member 116. Post 120 is preferably connected at the bottom to a ball similar to ball 52c of FIG. 2, so that the weight of the vertical column and of member 116 is supported by surface 14 through the ball.

Member 116 may be connected to a connecting member similar to member 72 of FIG. 2.

FIG. 4 is a perspective view of an apparatus for movably supporting equipment on an elevated surface to illustrate a second alternative embodiment of the invention. Instead of being connected to surface 14 by a restraining member as in FIGS. 1-3, the platform 212 in the second embodiment is connected slidably to a track 214 in surface 14 itself. Track 214 may comprise a member 216 similar to member 116 of FIG. 3. An elongated hole is first provided in surface 14 and member 216 is inserted into the hole until flange 216a is in contact with and supported by surface 14. Then platform 212 may be connected to member 216 in a manner essentially similar to that described above in reference to FIG. 3. In a manner similar to that described above, platform 212 may be rotated about post 220 which is slidably connected to member 216. Instead of leaving an exposed handle for operating the brake mechanism as in FIGS. 1-3, the handle may be hidden behind a plate 222 instead. Therefore, to release the brake, plate 222 is lifted. The second alternative embodiment illustrated in FIG. 4 is particularly advantageous where surface 14 is a top of a desk place at a corner of a room. The elongated hole in surface 14 may advantageously be diagonal across the desk. When use of equipment supported on platform 212 is desired platform 212 may be slid to the corner of the desk next to the user. When the equipment is no longer needed it can be slid along member 216 to the corner of the room, thereby freeing the desk top for the user.

FIG. 5 is a perspective view of an apparatus for movably supporting equipment on an elevated surface to illustrate a third alternative embodiment of the invention. The third alternative embodiment is similar to the second alternative embodiment of FIG. 4 in that the platform is connected slidably to a track in the surface itself; it differs from the embodiment of FIG. 4 in that, instead of being connected directly to the track, the platform is connected to the track through a pivot arm 16. The platform 12 and the pivot arm 16 and the parts for connecting the two are the same as that of the preferred embodiment in FIG. 2 so that the same numerals are used to label identical parts in the two figures. Slide track member 216 is similar to that of FIG. 4. A cylindrical post 252 is used to connect pivot arm 16 and track member 216. Post 252 comprises an upper portion 252a which may be inserted into pivot arm 16 from the bottom. Portion 252a may then be attached to pivot arm 16 rigidly by screw 254 which is screwed into threaded holes in the pivot arm and portion 252a. The bottom portion 252b of the post is then inserted into a washer 256, a bearing sleeve 258 and then inserted into member 216 until washer 256 rides on top of flange 216a of the track insert member. Washer 260 is then fitted over the bottom end of portion 252b and a snap ring 262 fits snugly into groove 252c to hold the entire assembly comprising post 252, washer 256, bearing sleeve 258, track insert number 216 and washer 260 together. Assembled in such manner, post 252 is connected slidably to track member 216. As the post slides in the track of member 216, the assembly is supported by the track member. Post 252 may also rotate with respect to the track member 216. This allows the pivot arm 16 to rotate with respect to the track member as well. In such manner, pivot arm 16 may rotate as well as slide with respect to the track.

Track member 216 is preferably mounted into a slot on work surface 14 so that its top surface is flush with surface 14 by a conventional method, such as epoxy adhesives or mechanical fasteners.

The above description of method and construction is merely illustrative of the invention and various changes in shapes and sizes and other details of the apparatus and method may be within the scope of the appended claims.

We claim:

1. An apparatus for movably supporting equipment on a work surface elevated from the ground level, said surface located adjacent to a location for an operator who operates the equipment, so that said equipment is movable towards and away from the operator while being supported by the surface, said apparatus comprising:

a support member adapted for supporting equipment, said member being movably supported by said surface so that equipment supported by the support member is movable to a location on the surface adjacent to the operator for convenient operation of the equipment, and so that the equipment supported by the support member is movable to desired locations on the surface away from the operator when the equipment is not being operated, thereby freeing the portion of the work surface adjacent to the operator when the equipment is not being operated; and a restraining member for restraining the movement of said support member on the surface to prevent the support member and the equipment thereon from falling off the surface, so that the equipment remains supported by the surface through the support member when the support member and the equipment thereon are at said location on the surface adjacent to the operator and when the support member and the equipment thereon are moved to locations on the surface away from the operator;

wherein the restraining member is elongated and the support member is connected to the restraining member slidably along the length of the restraining member, so that the distance between the support member and the location is adjustable and so that the length of the restraining member restricts the movement of the support member on the surface.

2. The apparatus of claim 1, wherein the support member is connected to the restraining member so that it is rotatable with respect to the connection between the two members.

3. The apparatus of claim 1, wherein the location is at or near an edge of the surface, and wherein said restraining member is so connected to the surface that the support member is rotatable substantially only within a predetermined angle about said location to prevent the support member and the equipment thereon from falling off the surface at said edge.

4. The apparatus of claim 1, wherein said surface is that of a desk top and wherein the support member is adapted for supporting a computer monitor or computer-related equipment.

5. The apparatus of claim 1, further comprising:

connecting member attached to the surface, said connecting member pivotally connected to the restraining member, said connecting member having a curved curb having two ends and a curved recess between the two ends of the curb, said curb and recess together surrounding the pivotal connection, said restraining member having a removable portion protruding into the recess, so that when the restraining member is rotated about the pivot relative to the connecting member, the portion moves in the recess until it contacts one of the two ends of the curb, and so that the restraining member is rotatable relative to the connecting member and the surface for an angle defined by the angular separation between the two ends of the curb about the pivot.

6. The apparatus of claim 5, wherein when the portion is removed from the restraining member, the restraining member is substantially unrestricted when rotated relative to the connecting member.

7. The apparatus of claim 1, further comprising a braking member connected to the support member for preventing movements of the support member and of the equipment thereon relative to the work surface.

8. The apparatus of claim 7, wherein said braking member is releasable, so that when said braking member is released, said support member and the equipment thereon are movable to desired locations on the surface.

9. The apparatus of claim 1, wherein the restraining member connects the support member to the surface at the connecting location of the surface so that the support member is at a distance from said location, and wherein said distance is of such magnitude that the equipment is constantly supported by the surface through the support member.

10. A work support structure for movably supporting equipment so that the equipment is movable towards and away from an operator who is located adjacent to the structure, said structure comprising:
   a body having a top surface for supporting equipment, wherein said surface defines a track, said surface located adjacent to the operator; and
   a support member adapted for supporting equipment; and
   a restraining member connecting the support member pivotally to the track at a connecting location so that the restraining member is slidable relative to the track and rotatable about the connecting location so that the support member is at a distance from the connecting location, wherein said track is so located relative to the surface and the distance is of such magnitude that the equipment supported by the support member is movable to a location adjacent to the operator for convenient operation of the equipment and is movable to desired locations on the surface away from the operator when the equipment is not being operated thereby freeing the portion of the work surface adjacent to the operator when the equipment is not being operated, and that the equipment and the support member are constantly supported by the work surface, thereby preventing the equipment from falling off the surface, wherein the support member is moved to locations on the surface by sliding the restraining member along the track and rotating it about the connecting location.

11. The structure of claim 10, wherein said surface is that of a desk top and wherein the support member is adapted for supporting a computer monitor or computer-related equipment.

12. The structure of claim 10, further comprising a braking member connected to the support member for preventing movements of the support member and of the equipment thereon relative to the surface.

13. The structure of claim 10, wherein said track is an elongated hole in the surface.

14. The structure of claim 10, wherein the restraining member is elongated with one end connected to the track and wherein the support member is connected to the restraining member slidably along the length of the restraining member, so that the distance between the support member and the connecting location is adjustable and so that the length of the restraining member restricts the movement of the support member on the surface, thereby permitting the support member to be slid as well as rotated to locations on the surface within a radius from the connecting location which is substantially equal to or less than the length of the restraining member.

15. An apparatus for movably supporting equipment on a work surface elevated from the ground level, said surface located adjacent to a location for an operator who operates the equipment, so that said equipment is movable towards and away from the operator while being supported by the surface, said apparatus comprising:
   a support member adapted for supporting equipment, said member being movably supported by said surface so that equipment supported by the support member is movable to a location on the surface adjacent to the operator for convenient operation of the equipment, and so that the equipment supported by the support member is movable to desired locations on the surface away from the operator when the equipment is not being operated, thereby freeing the portion of the work surface adjacent to the operator when the equipment is not being operated; and
   a restraining member for restraining the movement of said support member on the surface to prevent the support member and the equipment thereon from falling off the surface, so that the equipment remains supported by the surface through the support member when the support member and the equipment thereon are at said location on the surface adjacent to the operator and when the support member and the equipment thereon are moved to locations on the surface away from the operator;
   wherein the restraining member is pivotally connected to the surface at a connecting location of the surface so that the restraining member and the support member are rotatable about said location, and so that the equipment supported by the support member is movable between the location adjacent to the operator and the desired locations away from the operator by rotating the support member about said connecting location.

16. The apparatus of claim 15, wherein the restraining member is elongated and the support member is connected to the restraining member slidably along the length of the restraining member, so that the distance between the support member and the location is adjustable and so that the length of the restraining member restricts the movement of the support member on the surface, thereby permitting the support member to be slid as well as rotated to locations on the surface within a circle whose radius is substantially equal to the length of the restraining member.

* * * * *